No. 767,170. PATENTED AUG. 9, 1904.
L. W. ROSENTHAL.
ENGINEER'S SLIDE RULE.
APPLICATION FILED MAR. 4, 1904.
NO MODEL.
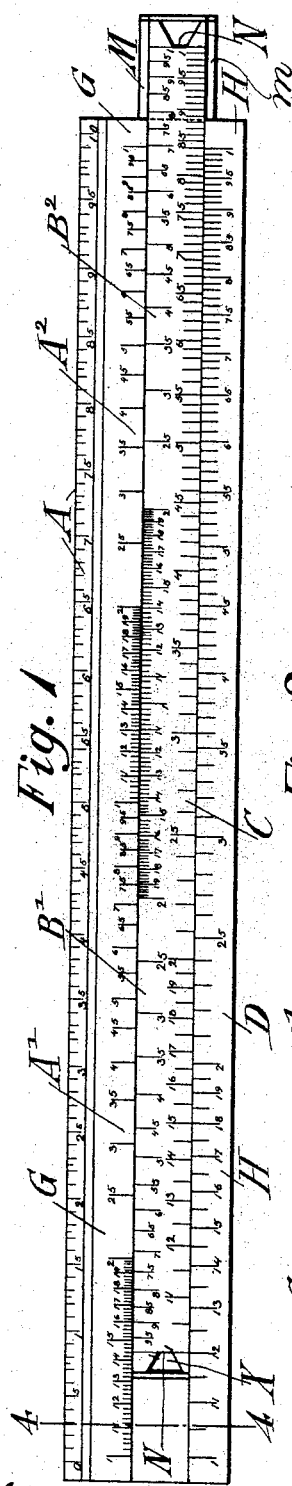
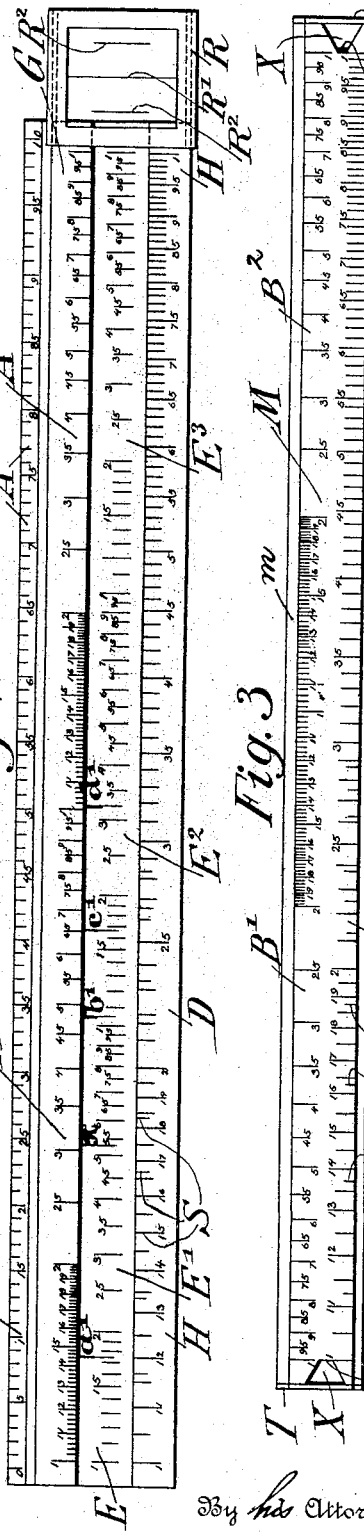
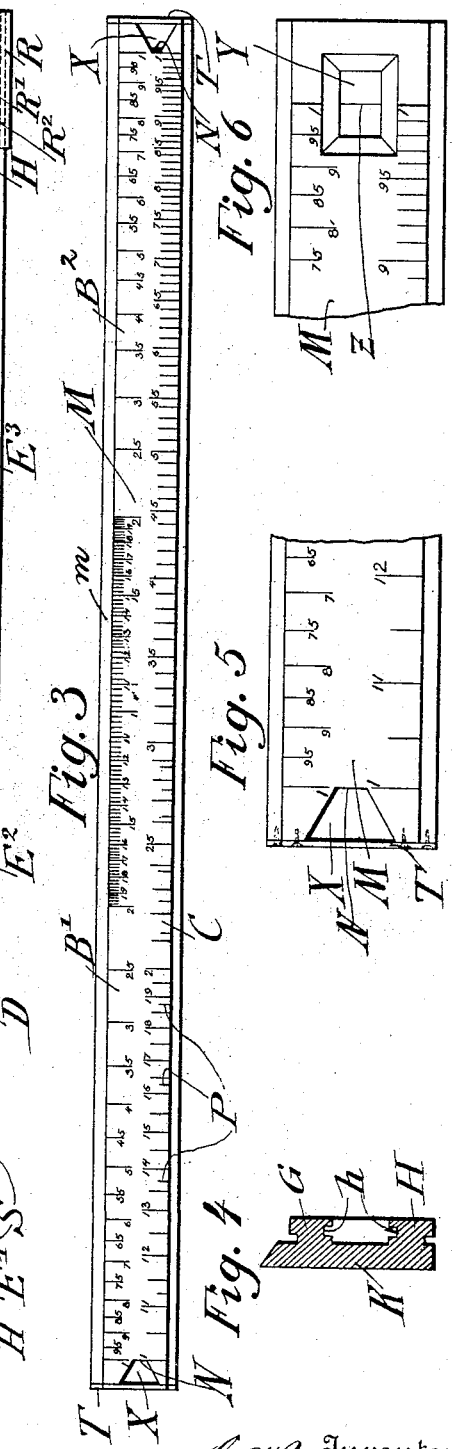
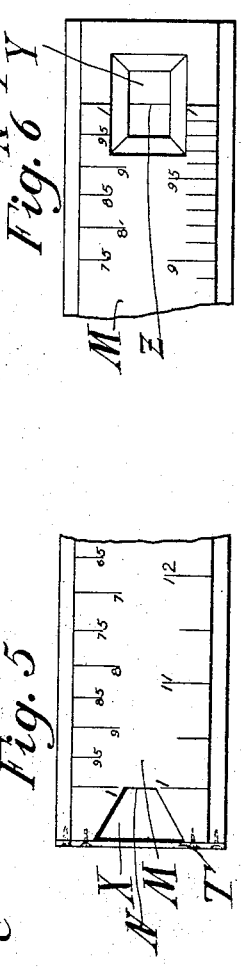
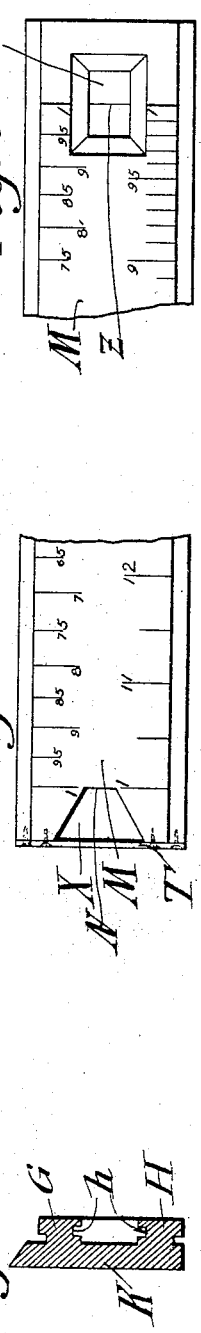
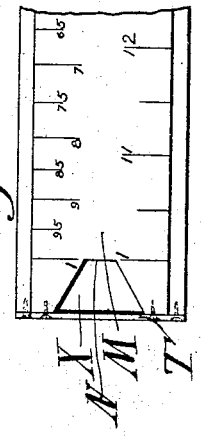

No. 767,170. Patented August 9, 1904.

UNITED STATES PATENT OFFICE.

LEON WALTER ROSENTHAL, OF NEW YORK, N. Y.

ENGINEER'S SLIDE-RULE.

SPECIFICATION forming part of Letters Patent No. 767,170, dated August 9, 1904.

Application filed March 4, 1904. Serial No. 196,581. (No model.)

*To all whom it may concern:*

Be it known that I, LEON WALTER ROSENTHAL, a citizen of the United States, residing in New York, borough of Manhattan, and State of New York, have invented certain new and useful Improvements in Engineers' Slide-Rules, of which the following is a specification.

In the well-known Mannheim slide-rules in general use it was impossible to find the product of more than two numbers at one setting. To enable engineers to find the product of three numbers at one setting, a rule has been proposed, known as the "duplex" rule, having scales on both sides of the same, which, however, increase the cost of such rules, decrease their scope of application, and, furthermore, require the inverting of the entire rule in order to obtain the final reading in each case.

My invention relates to engineers' slide-rules, and more particularly to improvements on the Mannheim rules, and has for its object to provide a rule whereby the product or continued quotient of three numbers may be more readily and accurately determined, a solution of many common and useful problems facilitated and made possible, and the results obtained with convenience and accuracy, and yet the general physical characteristics of the Mannheim type of slide-rule retained. For this purpose the invention consists of an engineer's slide-rule having two fixed bars connected with and arranged parallel to each other by a cross-piece the under face of which is adapted for the usual table of constants, one of said bars having a logarithmic scale progressing from the left to the right, the other having a scale progressing from the left to the median point of the graduated length of the rule and the other scale from this point toward the right of the rule, and a movable slide interposed between these bars having one scale in juxtaposition with the scale of the bar progressing from the left to the right for the graduated length of the rule and having two other logarithmic scales each progressing from the median point of the graduated length of the slide toward the ends of the same; and the invention consists, further, of a slide-rule having a series of logarithmic scales, known hereinafter as the "scale of cubes," arranged in cubical relation to the scale of one of the fixed bars of the rule and in three-half-power relation to the two scales of the other fixed bar; and the invention consists of certain novel features by the use of which many calculations may be greatly facilitated and additional computations made possible, as will be more fully described hereinafter and finally pointed out in the claims.

In the accompanying drawings, Figure 1 represents an upper face view of my improved slide-rule. Fig. 2 also shows an upper face view of the same with the slide entirely removed, so as to show the scale of cubes. Fig. 3 shows an upper face view of the slide. Fig. 4 shows a transverse section taken on line 4 4, Fig. 1. Fig. 5 is a detail view of the end of the slide arranged so as to facilitate the readings when the scale of cubes is used, and Fig. 6 is a detail view showing a modified form of the end of the slide.

Similar letters of reference indicate corresponding parts.

Referring to the drawings, A represents the main piece of my improved slide-rule, which main piece consists of two fixed parallel bars G and H and a member or cross-piece K, connecting the under faces of the fixed bars, and having a plane under face provided with a table of constants or other frequently-occurring and useful information in the usual manner. The bars G and H are provided at their inner edges with longitudinal grooves $h$, in which is guided a slide M, that is provided at its edges with longitudinal tongues $m$. The slide M is guided in the longitudinal depression of the main piece A between the fixed bars G and H. The fixed bar H is provided with a logarithmic scale D, progressing from the left toward the right for the graduated length of the rule, and the bar G is provided with two logarithmic scales, the scale $A'$ progressing from the left-hand end to the median point of the bar and the scale $A^2$ from the median point toward the right-hand end of the bar.

R represents a runner, similar to that of the ordinary rules, provided with a piece of glass or other transparent material, having a fine distinct line marked across the under side of its face and placed arbitrarily at the center of the glass.

The under face of the slide M is arranged with three scales, well known in slide-rules and not shown in the drawings. One of these scales is for the purpose of trigonometrical computations involving the sines of angles and is ordinarily used in conjunction with the scales A' A² of the fixed bar G, known as the "scale of squares." The second scale on the under face of the slide is for the purpose of trigonometrical computations involving the tangents of angles and is ordinarily used in conjunction with the scale D of the fixed bar H. The third scale on the under face of the slide M is generally arranged intermediately between the trigonometrical scales just mentioned, has equally-spaced divisions, and is ordinarily used in conjunction with the scale D for the solution of problems in which actual mantissæ of logarithmic numbers are to be noted.

The parts so far described are the same as in the well-known Mannheim slide-rule. The slide M is provided on its upper face on one side of its longitudinal center line with a logarithmic scale C, progressing from the left toward the right of the slide for the graduated length of the same and in juxtaposition with the scale D of the bar H; but instead of having two additional scales on the other side of the longitudinal center line of the slide progressing in the same direction and in juxtaposition to the scales of the fixed bar G, as heretofore, the improved slide M has two logarithmic scales B' B², each progressing from the median point of the graduated length of the slide in opposite directions to each other to the ends of the same. By this arrangement my improved slide has two logarithmic scales both progressing from the median point toward the ends of the slide, the scale B² progressing from the median point toward the right-hand end of the rule and the scale B' progressing from the median point toward the left-hand end of the rule, whereby the right-hand scale B² is in exact coincidence with the right-hand scale A² of the bar G, while the left-hand scale B' is in reverse with respect to the scale A' of the bar G. By this arrangement one is enabled to find the product of three numbers at one setting of the slide or the continued quotient of three numbers—that is, one number divided by the product of two numbers—likewise at one setting of the slide, manipulations which require two settings with the ordinary Mannheim rule, together with additional time and labor and decreased accuracy connected therewith.

In the drawings the scale B' is shown to progress in opposite direction to that of scale A'. Instead of this arrangement the scale B' may equally well be arranged so as to be in juxtaposition to scale A', and the direction of the scale B² be made opposite to that of scale A², or the slide M may be provided with two scales progressing in the same direction and either one of the scales constituting half the graduated length of the rule arranged so as to progress in opposite direction to either of the scales of the slide. The arrangement of one of the scales of the slide, either as shown in the drawings or else with the reversed scale in the position there given to B², would require the least change in the ordinary rule and would be the preferable form.

By the proposed arrangement of the scale B' with respect to the scale A' the reciprocal of numbers is dealt with instead of the numbers themselves. Thus by setting the left-hand index of the scale B' in coincidence with the left-hand index of the scale A' or A² it is found that in coincidence with all numbers on the scale A' or A² will be directly found the respective reciprocals on the scale B'. Thus the reciprocal of two is .5, of four is .25, of five is .20, &c., as may be seen by comparing scale A' of Fig. 2 with scale B' of Fig. 3.

The product of two numbers is exactly equivalent to the quotient obtained by dividing either factor by the reciprocal of the other, and the division of one number by another is exactly equivalent to the product obtained by multiplying the dividend by the reciprocal of the divisor. Hence to multiply two numbers either one of the factors on scale B' is placed in coincidence with the second factor on scale A' or A², and over one index of B' is found the product on A' or A². Thus in Fig. 1 where "4" on scale B' is in coincidence with "36" on scale A' their product "144" is read on scale A' above the left-hand index of scale B'. Similarly, to divide one index of B' is brought under the dividend on either scale A' or A² and the quotient is read on A' or A² above the divisor on scale B'. Thus to divide one hundred and forty-four by two the left-hand index of scale B' is placed in coincidence with "144" on scale A' and over "2" on scale B' is found the quotient "72" on scale A'.

In practice it has been found easier and more accurate to multiply than to divide, because with the Mannheim or ordinary arrangement of the scales it is necessary to set the divisor in coincidence with the dividend, nearly always requiring the use of the indicator-line of the runner as a guide to the setting, whereas in multiplication one index is used in the initial setting. With the arrangement of scales as forming part of my improved slide-rule the process of division becomes one of multiplication, thus obviating the disadvantages of the common method of division.

With my improved slide-rule multiplication of three factors is accomplished at one setting, since in using scale B' the product of two factors is found over its index, which is the required setting for multiplication of that product by any number on scale $B^2$. Thus the product of two multiplied by seventy-two multiplied by four will be found in the following manner: Set "72" on $B'$ to "2" on $A'$ and over "4" on $B^2$ find "576" on $A^2$. Similarly, in the division of one number by two others the time and labor is much reduced, while the accuracy of the final result is increased. For example, the solution of thirty-six divided by twenty-five multiplied by six would be obtained in this manner: Set "25" on $B^2$ to "36" on $A^2$ and over "6" on $B'$ read ".24" on $A'$.

The multiplication or division of more than three factors may be performed by the same methods with a proportionate saving of time and labor and an increase of accuracy in each case. Thus the product of four or five factors may be determined in two settings instead of three or four, as with the Mannheim type of slide-rules hitherto in use. Similarly, the division of one number by three or four factors is found in two settings instead of in three or four as heretofore.

Proportion is either direct or inverse, the latter necessitating for its most rapid and convenient solution with the ordinary arrangement of scales that the slide be withdrawn from between the fixed bars and turned end for end before replacing. This operation requires a certain amount of time and is liable to subject the slide to wear and damage and in a short time render the rule unfit for accurate determinations. Furthermore, the readings are not so accurate, owing to the fact that the numbers on the slide are then upside down. By the use of scale $B'$ as arranged inverse proportion is as readily solved as direct. The following problem illustrates this method: What will be the speed of rotation of a pulley six inches in diameter when driven by a belt from another pulley having a diameter of thirty-six inches and making four hundred revolutions per minute—that is, $36:6::X:400$? Solution: Set "36" on $B'$ to "400" on $A'$ and over "6" on $B'$ find "2,400" revolutions per minute on $A'$.

Also in many common problems of design where the product of two factors is a fixed quantity all possible combinations which will give that product are directly found in coincidence on scales $B'$ and $A'$ or $A^2$ when one index of $B'$ is set on the constant quantity on $A'$ or $A^2$.

For the determination of cubes and cube-roots of any number I arrange the scale E, consisting of three logarithmic scales $E'$ $E^2$ $E^3$, which are similar and in every respect identical to each other, on the face of the depression of the main piece A, intermediately between the fixed bars G and H. These scales are of such relation to the scales D of the bar H that any number of the bar H is in line with its cube found on scale $E'$, $E^2$, or $E^3$.

The scales $E'$ $E^2$ $E^3$ are in such relation to the scales $A'$ and $A^2$ of the bar G that any number of the bar G is in line with its three-half power found on the scales $E'$, $E^2$, or $E^3$. Thus the cube or third power of twelve is found to be "1728" on scale $E'$ in line with "12" of the bar H. Conversely, the cube-root of twenty-seven is found to be "3" on scale D in line with "27" of scale $E^2$. Similarly, the three-half power of four is found to be "8" on $E'$ in line with "4" on scale $A'$ of bar G. Conversely, the two-third power of eight is found to be "4" on scale $A'$ in line with "8" of scale $E'$ In using the scale of cubes it is found desirable to provide each end of the slide with a recess X, extending from the extreme end of the slide as far as the line of the nearer index of the scales on the slide, as shown in Fig. 3 and enlarged in Fig. 5. When the scale of cubes is used in the course of solving a problem, the innermost edge of the recess X, in line with the index of the slide, becomes the indicating edge N. In place of a recess the slide may be provided with a slot Y, having a transverse indicator-thread Z in alinement with the index of the scale on the slide, as shown in Fig. 6, so as to obtain an accurate setting of the numbers of any other logarithmic scale on the rule or slide when used in conjunction with the scale of cubes.

When a slide is provided having a recess X, as shown in Fig. 5, the ends of the slide are preferably provided with a metallic crossband T, so as to facilitate the manipulation of the slide and render it less liable to injury. Instead of the recess X or slot Y the ends of the slide may be left intact, in which case the edge itself of the slide would be used. In this case allowance for the distance between the end of the slide and the index-line would have to be made for each setting, which is accomplished by providing the runner with a short parallel line $R^2$ on each side of the indicator-line $R'$ of the same. The recess X or slot Y permits, however, the direct use of "constant-demarkations," which represent the fixed points corresponding to the constants in most general use. Thus the indicating edge N or line Z would be set on $a'$ $b'$ $c'$ $d'$, &c., representing values of constants and the product of the same with any factor obtained at one setting. The constants themselves may be designated directly as $\pi$ or a system of symbols as $a'$ $b'$ $c'$ $d'$, &c., used, the interpretation of which would be found on the under face of the cross-piece K.

In using the scale of cubes with all numbers having one, four, seven, or ten, &c., digits scale $E'$ is used, for numbers having two, five, eight, or eleven, &c., digits scale $E^2$ is used, and for those numbers having three, six, nine, or twelve, &c., digits scale $E^3$ is used.

The following are some of the many problems which may be solved at a single setting by the use of the reversed scale B' or the scale of cubes in conjunction with the other scales as arranged and located. More complicated problems requiring more than one setting are readily solved with the proposed rule with a proportionate saving in time and labor and with increased accuracy over the ordinary slide-rule.

1. $3^4 = 3^2 \times 3 \times 3 = ?$ Over "3" on scale D set "3" on B' and over "3" on B² read "81" on A²—that is, the factor three is squared by reading directly from scale D to scale A' and the product multiplied by the two other factors all at one setting.

2. $\sqrt{a \times b \times c} = ?$ Set $a$ on B' to $b$ on A' or A² and under $c$ of B² find $\sqrt{a \times b \times c}$ on D.

3. $\sqrt{\dfrac{a}{bc}} = ?$ Set $b$ on B² to $a$ on A' or A² and under $c$ of B' find $\sqrt{\dfrac{a}{bc}}$ on D.

4. $\sqrt[3]{\dfrac{a^2}{b}} = ?$ Set the indicating edge N or line Z of the slide to $a$ on scale E and over $b$ on B' read $\sqrt[3]{\dfrac{a^2}{b}}$ on A' or A².

5. $b \sqrt[3]{a^2} = ?$ Set the indicating edge of slide to $a$ on scale E and over $b$ on B² read $b \sqrt[3]{a^2}$ on A' or A².

6. $b^2 \sqrt[3]{a^2} = ?$ Set the indicating edge of slide to $a$ on scale E and above $b$ on C read $b^2 \sqrt[3]{a^2}$ on A' or A².

7. $\sqrt{(a \times b)^3} = ?$ Set $a$ on B' to $b$ on A' or A² and at edge of slide read $\sqrt{(a \times b)^3}$ on scale E.

8. $\sqrt{\dfrac{(a)^3}{b}} = ?$ Set $b$ on B² to $a$ on A' or A² and at edge of slide read $\sqrt{\dfrac{(a)^3}{b}}$ on E.

9. $\sqrt[3]{a^5} = ?$ Set the indicating edge of slide to $a$ on scale E and over $a$ on B² read $\sqrt[3]{a^5}$ on A' or A².

10. $\sqrt[6]{a^5} = ?$ Set the indicating edge of slide to $a$ on scale E and under $a$ on B² read $\sqrt[6]{a^5}$ on D.

11. $\dfrac{1}{\sqrt[6]{a}} = ?$ Set the indicating edge of slide to $a$ on scale E and under $a$ on B' read $\dfrac{1}{\sqrt[6]{a}}$ on D.

12. $\dfrac{1}{\sqrt[3]{a}} = ?$ Set the indicating edge of slide to $a$ on scale E and over index on D read $\dfrac{1}{\sqrt[3]{a}}$ on C.

It is found in processes of multiplication, division, &c., that the slide-rule is most convenient, rapid, and acccurate for the engineer, architect, or merchant if graduations be placed on the logarithmic scales corresponding to fractional parts, such as sixths, eighths, twelfths, &c. Thus when each unit is divided into twelve parts on scales C and D the operator is at once enabled to calculate square measure or cubical contents when one or all of the individual lengths are given in both feet and inches, so the merchant can more easily and readily calculate the cost of merchandise when the price or length, or both, are given in fractional parts of their respective units, such as three and one-eighth cents per yard or ten and one-eighth yards at five and three-eighths cents. Similarly total weights are estimated more rapidly and to a greater nicety when the factor is given in both pounds and ounces. In order to adapt the slide to more varied uses without confusing the scale, it has been found more preferable to divide the scale D into graduations of sixths or twelfths and the scale C into graduations of eighths, or vice versa, using different-colored markings for them for the sake of clearness. These graduations are clearly shown in Figs. 2 and 3 and are designated by P and S, respectively.

The additional cost of manufacture, the absence of the table of constants and other useful information usually found on the back of the ordinary Mannheim slide-rule, and the impossibility of making trigonometrical and other computations without the aid of an additional slide, together with many inherent disadvantages, lack of adjustability against warping, &c., are the reasons that the Duplex rule did not find the favor with calculators that it would seem to merit. These disadvantages become the advantages of my improved rule and will serve to commend it at once to engineers and calculators.

I claim as new and desire to secure by Letters Patent—

1. A slide-rule, consisting of a main piece having two fixed bars, one bar having a single logarithmic scale the graduated length of the same, and the other bar having two scales each of half the graduated length of the rule, said scales progressing in one and the same direction, and a movable slide between said bars and provided with a single logarithmic scale on the side adjacent to the single scale of one of the fixed bars and with two scales on the opposite side progressing in opposite direction to each other, substantially as described.

2. A slide-rule, consisting of a main piece, and two fixed bars, one bar having a logarithmic scale progressing from the left-hand end toward the right-hand end of the bar for the graduated length of the same and the other bar having two scales each progressing from the left toward the right, one from the left-hand end to the median point of the graduated length of the bar and the other from the median point toward the right-hand end of the bar, and a slide movable between the fixed bars having a logarithmic scale on one side of its longitudinal center line in juxtaposition to the single logarithmic scale of one of the fixed bars, and two logarithmic scales on the other side of the longitudinal center line, one progressing from the median point toward the right-hand end of the slide and the other progressing from the median point toward the left-hand end of the slide, substantially as described.

3. A slide-rule, consisting of a main piece and two fixed bars, one bar having a logarithmic scale progressing from the left toward the right of the rule for the graduated length of the same and the other bar having two logarithmic scales each progressing from the left toward the right, one from the left-hand end to the median point of the graduated length of the bar and the other from the median point toward the right-hand end of the bar, and a slide movable between the two fixed bars having a logarithmic scale on one side of its longitudinal center line in juxtaposition to the single scale of one of the fixed bars, and two logarithmic scales on the other side of the longitudinal center line and progressing in opposite directions, one scale progressing in the same direction as one of the two scales of one of the fixed bars and the other progressing in the opposite direction to the other of the two scales, substantially as described.

4. In a slide-rule, the combination, with a main piece provided with two fixed bars, one bar being provided with two contiguous logarithmic scales, one progressing in one direction from one end of the bar toward its median point and the other scale from said median point in the same direction to the opposite end of the bar, the other bar having a logarithmic scale progressing the graduated length of the bar in the same direction as the scales of the first bar, of a slide guided between said fixed bars and provided at the edge adjacent to the last-named bar with a logarithmic scale extending through the graduated length of the slide and at the opposite edge with two logarithmic scales one progressing in one direction from the median point of the slide to one end of the same, while the other scale progresses in the opposite direction from the median point to the other end of the slide, substantially as described.

5. In a slide-rule, a slide provided along one edge with a logarithmic scale progressing in one direction from one end of the slide to the other and at the opposite side with two logarithmic scales, one progressing in one direction and the other progressing in the opposite direction, substantially as described.

6. In a slide-rule, the combination of a main piece consisting of a cross-piece provided with two fixed bars, each of said fixed bars having logarithmic graduations, and logarithmic graduations arranged on the cross-piece representing the cubes of numbers on one of the fixed bars and the three-half powers of the numbers on the other fixed bar, and a slide guided between the fixed bars and provided at each edge with a recess, substantially as described.

7. In a slide-rule, the combination of a main piece consisting of a cross-piece having logarithmic graduations and provided with two fixed bars, each having logarithmic graduations, the graduations of the cross-piece being in cubical relation to the graduations of one of the fixed bars and a slide having a recess at each end movable between the fixed bars, the edge of which recess serves to place either end of the graduated length of the slide in alinement with the graduations on the cross-piece, substantially as described.

8. In a slide-rule, the combination of a main piece consisting of a cross-piece having logarithmic graduations and provided with two fixed bars, each having logarithmic graduations, the graduations of the cross-piece being in three-half-power relation to the graduations of one of the fixed bars, and a slide having a recess at each end movable between the fixed bars, the edge of which recess serves to place either end of the graduated length of the slide in alinement with the graduations on the cross-piece, substantially as described.

9. A slide-rule, comprising a main piece consisting of a cross-piece having demarkations and two fixed bars provided with logarithmic scales, and a slide guided between said fixed bars, said slide being also provided with logarithmic scales and having a recess at each end of the graduated length of the same, the edges of which recess serve to place either end of the graduated length of the slide in alinement with the demarkations arranged on the cross-piece, substantially as described.

10. A slide-rule, consisting of a main piece composed of a cross-piece and two fixed parallel bars, and a slide guided between the fixed bars, said fixed bars, slide and the cross-piece between the fixed bars being provided with logarithmic graduations and each end of said slide having a recess, the inner edges of which serve to place it in alinement with the logarithmic graduations arranged on the cross-piece, substantially as described.

In testimony that I claim the foregoing as my invention I have signed my name in presence of two subscribing witnesses.

LEON WALTER ROSENTHAL.

Witnesses:
  GEORGE F. SEVER,
  HENRY J. SUHRBIER.